United States Patent [19]

Maslowski et al.

[11] 4,027,330
[45] May 31, 1977

[54] DISC RECORDING

[75] Inventors: Stefan Maslowski, Aufheim; Peter Huber, Thalfingen; Horst Redlich, Berlin, all of Germany

[73] Assignee: TED-Bildplatten Aktiengesellschaft, AEG-Telefunken, TELDEC, Zug, Switzerland

[22] Filed: Mar. 27, 1974

[21] Appl. No.: 455,395

[30] Foreign Application Priority Data

Mar. 27, 1973 Germany .......................... 2315735
Mar. 27, 1973 Germany .................... 7311922[U]

[52] U.S. Cl. .................... 358/128; 179/100.3 V; 179/100.4 C; 274/41 R
[51] Int. Cl.² .................. H04N 5/76; G11B 3/72; G11B 11/12
[58] Field of Search ............. 274/41 R, 41 A, 42 R; 179/100.4 R, 100.4 M, 100.4 C, 100.3 V, 100.1 B; 178/6.6 R, 6.6 D, 6.7 A

[56] References Cited

UNITED STATES PATENTS

| | | | |
|---|---|---|---|
| 2,258,596 | 10/1941 | Cortella | 179/100.4 K |
| 3,438,050 | 4/1969 | Aschenbrenner | 179/100.3 V |
| 3,569,636 | 3/1971 | Schuller | 179/100.1 B |
| 3,652,809 | 3/1972 | Bickopp et al. | 179/100.4 R |
| 3,737,589 | 6/1973 | Redlich et al. | 179/100.3 V |
| 3,800,099 | 3/1974 | Bickopp et al. | 179/100.1 B |
| 3,842,194 | 10/1974 | Clemens | 274/42 R |
| 3,902,010 | 8/1975 | Goshima | 178/6.6 R |

FOREIGN PATENTS OR APPLICATIONS 49-3604  1/1974  Japan ................. 358/128

*Primary Examiner*—Raymond F. Cardillo, Jr.
*Attorney, Agent, or Firm*—Spencer & Kaye

[57] ABSTRACT

A matrix to be used for fabricating disc shaped record carriers is produced by illuminating a photolacquer layer with a laser beam while the layer moves transverse to the beam axis and by controlling the beam so that it simultaneously produces a succession of spots modulated according to the information recorded and a continuous strip narrower than the spots and serving to provide a track guide for the scanning element of a playback device with which such a record carrier is to be used.

7 Claims, 14 Drawing Figures

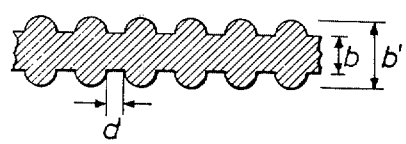
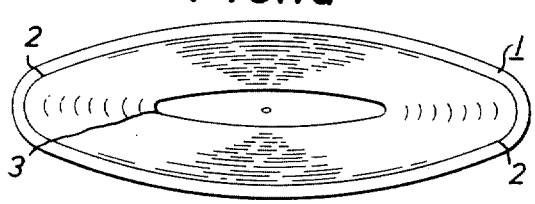
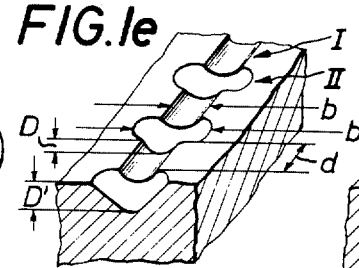
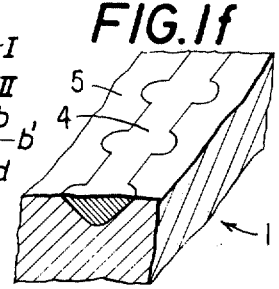
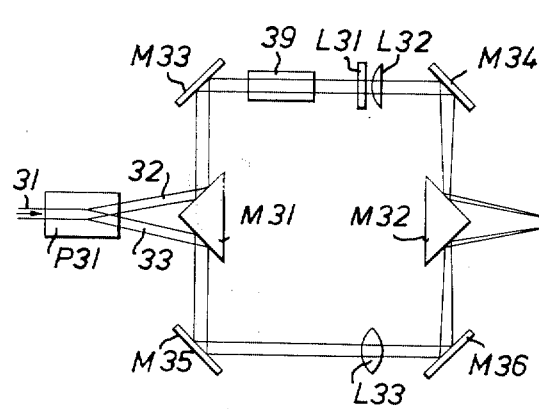
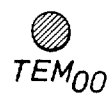
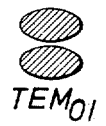
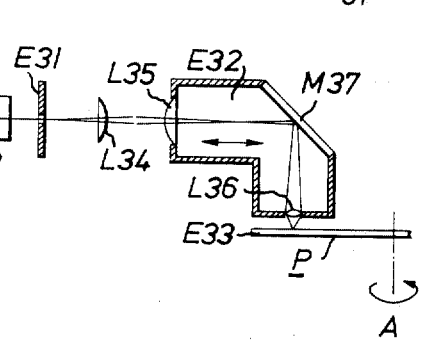
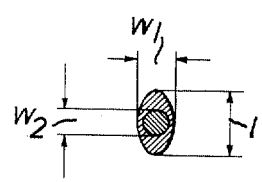

DISC RECORDING

BACKGROUND OF THE INVENTION

It is known to record sound oscillations mechanically on a planar signal carrier so that the recording extends along a spiral groove having closely adjacent turns, the sound oscillations having an upper frequency limit of approximately 20,000 Hz and the information being recorded as three-dimensional undulations, or deformations, on the surface of the recording groove. It is also known that it is possible, by the so-called pressure scanning technique, to mechanically scan much higher signal frequencies — up to several MHz — which are required for playing back video recordings. The spatial recording in the groove in this case is effected according to the depth, or hill-and-dale, recording technique.

Because of the broad frequency range to be covered in storing video signals, for example when storing a moving picture, the scanning of such a video recording must be effected with playback speeds which are substantially higher than those for the conventional sound recordings, and which can be as high as 1500 rpm for a 200mm diameter record.

It is obvious, however, that the recording of such video signals by mechanically, electrodynamically or electrostatically controlled recording devices cannot be effected at the same speed as playback because the member producing the deformations corresponding to the signals in the recording groove could not possibly, because of its mass inertia, follow the high frequency oscillations to be recorded, the frequency of which extends up to 4 MHz. A picture record copy, or the matrix therefor, is thus produced by an intermediate recording of the signals, as is done in the manufacture of ordinary phonograph records, for example on a magnetic carrier which is then played back at a speed which is reduced about 10 to 25 times so that with an upper frequency limit of about 4 MHz for the signals to be played back, the recording instrument must be capable of producing perfect recordings at frequencies up to about 160 or 400 kHz, respectively.

In spite of the greatly reduced recording speed, this upper frequency limit is still extremely high for an instrument which must be capable of producing mechanical deformations in the recording groove of a signal carrier. Even particularly good instruments and those designed for special purposes at the present have an upper recording frequency limit of approximately 30 to 40 kHz.

A stylus has now been proposed for video recordings which is capable of recording in a much higher frequency range, up to 400 kHz. But even with such a stylus, intermediate storage is still required in order to be able to record frequencies up to 4 MHz.

Efforts have been made to develop processes in which the intermediate storing can be eliminated. This is possible, for example, in the known recording technique by means of laser or electron beams in which photolacquer layers are exposed and subsequently etched. The difficulty arising in this process is mainly that it is necessary to record a track which can later be mechanically scanned. For this purpose it is known to precut the track mechanically and to subsequently expose it to laser beams. This dual recording, however, produces substantial difficulties because of the high groove density involved, which is up to 280 grooves per mm.

It has been discovered that a pure laser beam recording is possible, with all the advantages inherent in such a process, in that a type of dual peak recording is produced as it is known in the sound film art.

SUMMARY OF THE INVENTION

It is an object of the present invention to eliminate the above-noted difficulties by providing a method for laser illumination of photolacquer layers to produce a matrix for discshaped record carriers, particularly for picture records, which method is characterized in that a sequence of light dots which are modulated with the information is recorded together with a continuous track guide for guiding the scanning device.

A process which is also intended to solve the above-discussed problems is disclosed in an earlier filed German application and this earlier process is characterized in that the laser energy for the illumination process is adjusted so that at the focal point the photosensitive layer is completely exposed through its entire thickness and in the region outside of the focal point the secondary radiation, which is diffusely reflected by the carrier surface, exposes only part of the photosensitive layer from the bottom, but not all the way through.

In the recording process according to the present invention, the groove has a constant depth. During mechanical scanning according to the pressure transducer principle the "peaks", which have various widths depending on the information to which they correspond, produce the signals which the pressure transducer converts to electrical oscillations.

This process according to the invention can be carried out in various ways. Firstly, it is possible to expose the photolacquer to two laser beams which are focused on the photolacquer layer and which have a Gaussian intensity distribution relative to the width of the resulting track.

BRIEF DESCRIPTION OF THE DRAWINGS

FIGS. 1a, 1b and 1c are pictorial representations of the intersection of the laser beams with a photosensitive surface in the practice of one embodiment of the invention.

FIG. 1d is a perspective view of a record foil with a track according to the invention.

FIGS. 1e and 1f show a piece of the record foil of FIG. 1d with a track according to one and another respective embodiment of carrier of the invention.

FIGS. 2a and 2b are similar representations relative to a second embodiment of the invention.

FIG. 3a is a schematic diagram of one embodiment of apparatus according to the invention.

FIG. 3b is a representation similar to those of FIGS. 1 and 2 used to explain the operation of the system of FIG. 3a.

DESCRIPTION OF THE PREFERRED EMBODIMENTS

Figure 4:
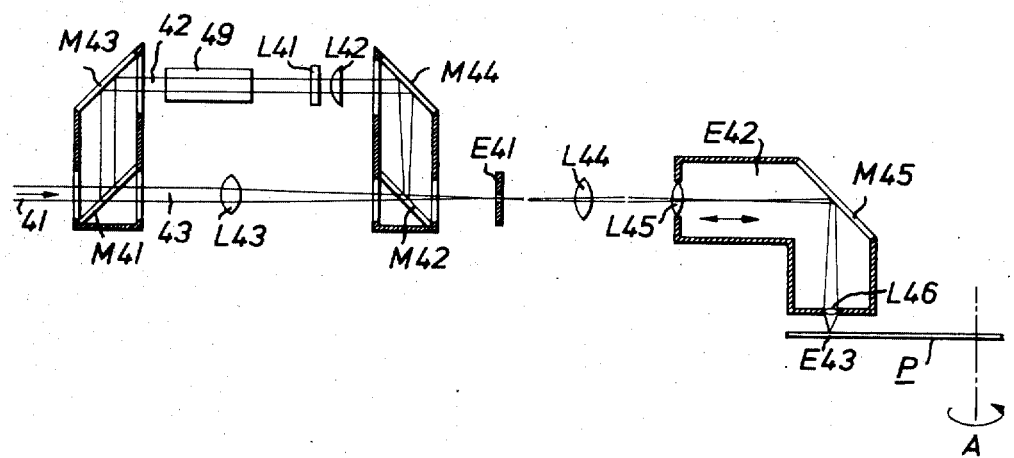
FIG. 4 is a view similar to that of FIG. 3a of another embodiment of the invention.

FIGS. 1a, 1b and 1c show the cross section of laser beams on the surface of a photosensitive, e.g., photolacquer, layer on which information is to be recorded along a spiral track, or path. Two beams are to be superimposed on one another at the photolacquer layer surface. The circular focus of the first, unmodulated, laser beam, whose cross section is shown in FIG. 1b, is selected so that it records only the continuous track guide path. The focus of the second laser beam, which is modulated with the information, is controlled by suitable optical elements so that its cross section is approximately elliptical, as shown in FIG. 1c. The minor axis of this ellipse is to lie in the direction of the track guide path and may correspond to the diameter of the circular focus of the first beam. The major axis of the ellipse is perpendicular to the track guide path and is, for example, twice the diameter of the circular focus of the first beam.

If the two foci are concentric to one another and if they are guided across the layer which is to be exposed, the exposure track shown in FIG. 1a is produced and this track contains the track guide path together with the information recording. It has a character similar to the dual peak recording known from the sound film art, but with the difference that the groove-shaped recording track has, when seen from the top, a strip shape with rounded protrusions which are arranged substantially symmetrically to the center line of the strip.

FIG. 1d shows a perspective view of a disc like record carrier foil with a groove-shaped spiral recording track between the circles 1 and 2. In FIG. 1e there is shown a piece of this carrier wiith the track in a greater scale. Seen in a top view the track of FIG. 1e looks like the exposure track of FIG. 1a.

One technique for proceeding from this exposure track to the groove of FIG. 1e is explained in the specification of U.S. Pat. No. 3,737,589, for example, although a different way is selected for producing an exposure track.

By the way it is possible to come to another kind of track looking like a groove filled by a soft material. If this is wanted one has to combine the steps of the method described in the copending application serial number 239 960 filed Mar. 31, 1972, now U.S. Pat. No. 3,800,099, issued Mar. 26, 1974, with the method disclosed herein. The result of this combination is the carrier of FIG. 1f with a strip of soft material 4 in the hard surface 5 of the carrier 1; this strip constitutes the track guide, a series of rounded and soft protrusions extending laterally from said strip.

Adjacent protrusions are spaced from one another by distances, d, which in FIG. 1a are approximately equal to one half the strip width, b. In the area of the protrusions the width b' of the recording track is approximately twice the width b in the strip-shaped region between adjacent protrusions. Moreover, the groove-shaped recording track is deeper in the regions II of the protrusions than in the strip-shaped regions I between protrusions.

The depth D in the strip-shaped region may be substantially constant while in a cross section taken along the center line of the strip perpendicular to the plane of FIG. 1a the contour of the groove depth has a rounded shape in the region of each protrusion corresponding to the intensity distribution of a laser beam moved with respect to the record carrier during the recording process. Thus, the symmetrically arranged protrusions have the form of recesses having a rounded bottom. The greatest depths D' in the groove, which occur each time in the center of the regions of the lateral protrusions, may be identical to one another.

In order to produce a focus with elliptical cross section, crossed cylindrical lenses with a suitable depth of focus may be used or a combination of a spherical lens and a cylindrical lens.

Another possibility to effect an exposure track as shown in FIG. 1a is illustrated in FIGS. 2a and 2b and involves superposing the focus of a laser beam with transversal $TEM_{01}$ mode, shown in FIG. 2b on the focus of a laser beam with transversal $TEM_{00}$ mode, shown in FIG. 2a. In this case the laser beam with the transversal $TEM_{01}$ mode is modulated with the information to be recorded.

Various possibilities exist to produce these two laser light beams. The following can be used:

a. two lasers of the same or different wavelengths;

b. two laser light beams with different wavelengths from one and the same laser, e.g., the laser spectral lines $\delta_1 = 488$ nm and $\delta_2 = 514$ nm from an argon ion gas laser. These laser light beams can be separated or reunited by means of optical elements, for example, dielectric, particularly dichroic, mirrors, prisms or polarization filters. As is known, in doubly refracting crystals dichroism is the physical phenomenon that they are transparent to two different colors, or wavelengths, in two different directions;

c. a monochromatic laser light beam which is split into two laser light beams, for example through a polarization filter or a semitransparent mirror.

The intensity of that laser light beam which serves to record the information is modulated by means of a suitable modulator, for example an electro-optical or acusto-optical modulator.

Both laser light beams are combined by an optical element, for example a dielectric, particularly a dichroic, mirror when laser light beams with different wavelengths are used or by a semitransparent mirror or a polarization filter, so that they subsequently become coaxial to one another.

The coaxial laser light beams are focused onto the photolacquer layer by an optical device, for example a microscope objective.

The focus of the laser light beam serving to record the information is deformed by an optical element disposed in front of the microscope objective as described above so that a recording as shown in FIG. 1c will be produced.

FIG. 3a is a schematic representation of an embodiment of this type of system for optically recording on a photolacquer layer.

A linearly polarized laser light beam 31 is split by a polarization filter P31, e.g., a Wollanston or a Rochon prism, into two partial beams 32 and 33. The partial beam 32 is sent via deflector mirrors M31 and M33 into the modulator 39. The modulator modulates the intensity of the partial beam 32 in a manner corresponding to the time-related variations in the information signal to be recorded.

Two lenses L31 and L32 which can be crossed cylindrical lenses with different indices of refraction or a combination of a cylindrical lens and a spherical lens focus, the partial beam 32 at plane E31 after it has traveled via deflector mirrors M34 and M32, to the polarization filter P32 which coaxially recombines it with partial beam 33. The partial beam 33 which is guided via deflector mirrors M31, M35, M36 and M32, is also focused in plane E31 by spherical lens L33.

The crossed cylindrical lenses L31 and L32 or the combination of a cylindrical lens and a spherical lens cause the partial beam 32 to come to a focus with an approximately elliptical cross section. The major and minor axes of the focus ellipse are $w_1$ and 1, respectively, as shown in FIG. 3b, $w_1 < 1$. The focus disc of partial beam 33 has a circular cross section with a diameter $w_2$ and is concentric with the elliptical focus disc of the partial beam 32, as shown in FIG. 3b.

Lenses L34 and L35 produce an intermediate image in plane E32 of the focus discs, or spots, present in plane E31. The magnification, or size ratio, between planes E31 and E32 is, for example, 1:1. Between lenses L34 and L35 the beam is collimated, i.e., the component rays are parallel, so that the distance between L34 and L35 can be set as desired. A corrected microscope objective L36 reproduces the intermediate image from plane E32 onto the photolacquer layer disposed in plane E33 to a smaller scale. The reproduction ratio is, for example, 1:10. The beam is directed to lens L36 by a deflection mirror M37.

If unit L35, M37 and L36 is moved in the direction of the double-headed arrow, the focus discs of partial beams 32 and 33 can be shifted in plane E33 and can be guided, for example, radially across a plate P which rotates about axis A.

FIG. 4 shows a further embodiment of apparatus for recording on a photolacquer layer.

A laser light beam 41 which may be monochromatic or may consist of light of two different wavelengths, is split into two beams 42 and 43 by the partially transparent mirror M41.

If beam 41 consists of light of two different wavelengths, M41 is preferably a dielectric, particularly a dichroic, mirror; for a monochromatic beam 41 it preferably is a semitransparent mirror. The partial beam 42 is modulated in modulator 49 with the information to be recorded and is focused at plane E41 by crossed cylindrical lenses L41 and L42 or by a combination of a spherical lens and a cylindrical lens. The focus disc is again elliptical, as shown in FIG. 3b. This beam is brought to modulator 49 and then to plane E41 by deflector mirrors M43 and M44. The partial beam 43 is focused onto plane E41 by a spherical lens L43 creating a circular focus disc.

Mirror M42 is again a dielectric, particularly a dichroic or semitransparent, mirror and serves to coaxially combine the two partial beams 42 and 43.

The two focus discs of the partial beams 42 and 43 in plane E41 are reproduced in plane E42 by lens system L44 and L45. This intermediate image is then reproduced in plane E43 to a smaller scale by the corrected microscope objective L46. The reproduction ratio is 1:10, for example. The combined beam is brought to lens L46 by a deflector mirror M45.

Between L44 and L45 the beam is collimated. If unit L45, L46 and M45 is displaced in the direction of the double-headed arrow, the focus discs, or spots, of the two partial beams can be shifted along plane E43 and can be guided, for example, radially across a plate P which rotates about axis A.

Figure 5:
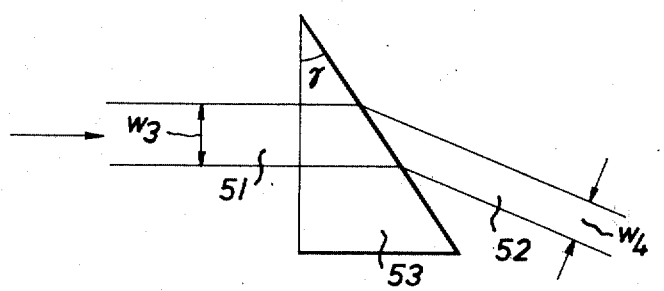
FIG. 5 is a side view of an element which can be used in embodiments of the invention.
Figure 6:
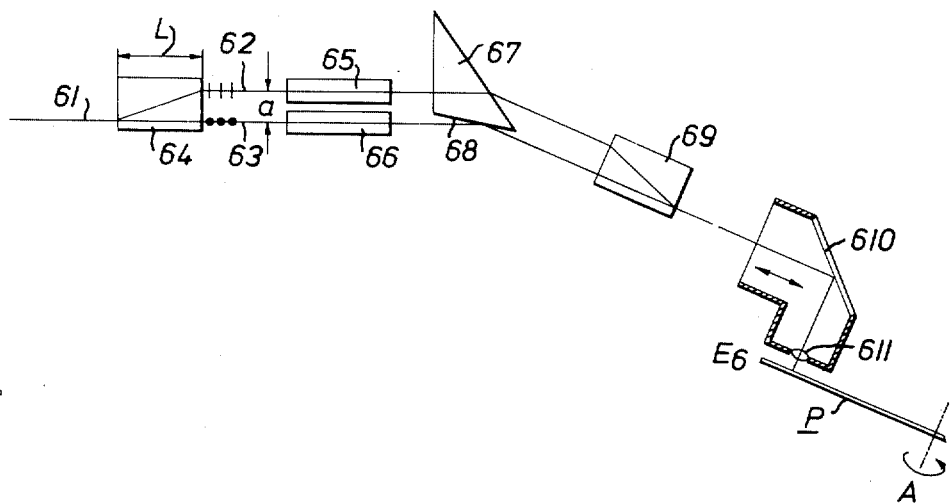
FIGS. 6 and 7 are views similar to that of FIG. 3a of further embodiments of the invention.
Figure 7:
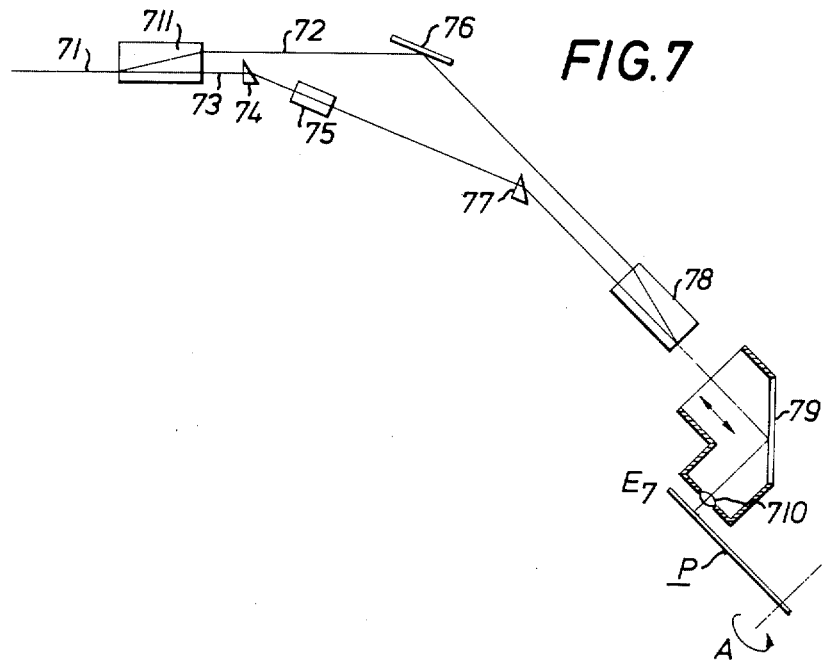

Further possibilities for performing the method according to the present invention are shown in FIGS. 5-7.

A laser light beam with an axially symmetrical Gaussian intensity distribution can be focused by a combination of prisms and axially symmetrical lenses so that the intensity distribution in the focus disc will be elliptical.

If a light beam with an axially symmetrical Gaussian intensity distribution is passed through a prism so that it is refracted asymmetrically with respect to the angle bisector of the prism refracting angle, the intensity distribution of the exiting light beam is elliptical with respect to the axis of the beam. A laser light beam with a Gaussian intensity profile is typical for known lasers oscillating in the $TEM_{oo}$-mode which is often called the 'fundamental mode' of a laser.

In FIG. 5 a parallel light beam with such an axially symmetrical Gaussian intensity distribution is shown at 51. Its diameter is assumed to be $w_3$. The entrance surface of a prism 53 with an index of refraction n is oriented perpendicular to the axis of beam 51, for example. The light beam is refracted by prism 53. Thus the diameter of the beam is changed in the direction of the plane of the drawing, i.e., in the plane defined by the axis of the refracted beam and by the perpendicular to the refracting plane, while the diameter remains unchanged in a direction perpendicular to the plane of the drawing. The cross section of the refracted beam 52 is thus elliptical with the ellipse having a major axis $W_3$ and a minor axis $w_4$. In the case shown in FIG. 5, $w_4$ is given by:

$$w_4 = \frac{1 - n^2 \sin^2 \gamma}{\cos \gamma} w_3$$

The value of the ratio $w_4/w_3$ in the present case in determined by the refracting angle $\delta$ and the index of refraction n. Generally the value of ratio $w_4/w_3$ depends on the angle of impingement of the impinging light beam, the refracting angle and the index of refraction n.

In order to split the laser light beam into two partial beams, the following embodiments employ a doubly refracting crystal, for example a calcite crystal. This crystal is cut so that the impinging, linearly polarized light beam is split into two mutually perpendicularly polarized light beams whose axes will be parallel to one another after the beams leave the crystal.

By changing the plane of polarization of the impinging light beam with respect to the crystal the intensities of the two partial beams relative to one another can be varied. The two partial beams are recombined by a similar further crystal of doubly refracting material.

In two further embodiments which are illustrated in FIGS. 6 and 7 this process can be employed for producing matrices for picture records by the laser illumination of a photolacquer layer.

FIG. 6 shows a linearly polarized, collimated laser light beam 61 with an axially symmetrical Gaussian intensity distribution which is split by a doubly refracting crystal 64 into two light beams 62 and 63 which are polarized perpendicularly to one another, the respective polarization directions being shown diagrammatically at the exit side of crystal 64. Light beams 62 and 63 have axes which are parallel to one another after the beams exit from the crystal 64. The intensity of the light beam 62 is modulated in modulator 65 with the information to be recorded. The intensity of the light beam 63 can be varied relative to that of light beam 62 by modulator 66, which may form a unit with modulator 65, for example, but with separate electrical controls, in the an appropriate direct voltage is applied. However, modulator 66 can be eliminated.

Modulated beam 62 is refractd by a prism 67, corresponding to prism 53 of FIG. 5, so that its intensity distribution is elliptical with respect to the axis of the beam once it leaves the prism. The light beam 63 is deflected by a deflector mirror 68, which may be a separate mirror or which may form a unit with prism 67, so that the axis of beam 63 extends parallel to the axis of refracted beam 62 as it leaves prism 67. A doubly refracting crystal 69 then recombines the two light beams so that their axes coincide.

A microscope objective 611 focuses the light beams, which travel coaxially to one another and are reflected by deflector mirror 610, onto plane E6. The focus disc of beam 63 is circular, while that of beam 62 is elliptical. Their centerpoints coincide. Thus there is again produced a focus pattern as shown in FIG. 3b.

In plane E6 the photolacquer layer to be exposed is again carried on a plate P which rotates about axis A.

If the light beam 61 is collimated when it leaves crystal 69, the distance between crystal 69 and the deflector mirror 610 can be varied so that simultaneous displacement of deflector mirror 610 and microscope objective 611 in the direction of the double-headed arrow causes the focus discs, or spots, to be guided across plane E6.

It is also possible, however, to focus the impinging light beam 61 by means of a lens, not shown in FIG. 6, which is disposed, or example, in front of beam divider 64, so as to cause the focus disc of the beam 62 to fall into the modulator 65.

In this case an intermediate image must be produced behind the doubly refracting crystal 69, as in the arrangements according to FIGS. 3a and 4, in order to be able to guide the focus discs across plane E6.

The distance, a, between the axes of the two light beams 62 and 63 in the arrangement according to FIG. 6 is determined by the dual refraction of the crystal 64, its orientation and its length. When a calcite crystal is used with an orientation which produces maximum splitting, and with a crystal length L of 30mm this distance a will be 3.3mm, for example.

The physical dimensions of the modulator 65, and possibly of the additional modulator 66, must be adapted to this relatively short distance between the axes of the two partial beams 62 and 63. If the modulator 66 is eliminated, a bore for the partial beam 63 may be provided in modulator 65 next to the modulation crystal through which partial beam 62 passes.

If both partial beams are to be modulated, two modulation crystals, for example, may be provided within a modulator housing so as to be separated by a spacing $a$.

In the embodiment shown in FIG. 7, an arrangement of two prisms in a row is provided to produce a greater spatial separation between the axes of the two partial beams. This also permits installation of a larger modulator without difficulty. A linearly polarized, collimated laser light beam 71 with an axially symmetrical Gaussian intensity distribution is split into two light beams 72 and 73 which are polarized perpendicularly to one another by a doubly refracting crystal 711. The light beam 73 is refracted by a prism 74 through which it passes asymmetrically and then passes through modulator 75. Modulator 75 modulates the intensity of this light beam with the information to be recorded. In a further prism 77 the light beam 73 is again refracted. One or both of prisms 74 and 77 can have the form of prism 53 of FIG. 5 to be traversed by light beam 73 in such a manner that its intensity distribution becomes asymmetrical. Prisms 74 and 77 may be so designed, for example, that the light bundle impinges perpendicularly to the entrance surface and exits at the Brewster angle.

The light beam 72 is deflected by a deflector mirror 76 in such a manner that it is parallel to the light beam 73 after it exits from the prism 77. By displacing the mirror 76 in the direction of the impinging light beam 72 the spacing between the axes of the two partial beams in front of crystal 78 can be set. The doubly refracting crystal 78 recombines the mutually perpendicularly polarized light beams in such a way that their axes coincide. Behind the doubly refracting crystal 78 the further beam path is identical with that in the embodiment of FIG. 6.

A mirror 79 reflects the coaxial beams toward a microscope objective 710 which focuses the light beams onto plane E7. The focus disc of beam 72 is circular, while that of beam 73 is elliptical. Since their center points coincide there again results a focus pattern a shown in FIG. 3b.

The photolacquer layer to be exposed is disposed in plane E7 on a plate P which rotates about axis A.

As is apparent from FIG. 1a, the novel process of the invention records an uninterrupted track. During mechanical scanning, or playback, for example according to the pressure transducer principle, the scanning diamond is thus continuously guided in the track. The novel process can also be used with advantage for optical scanning, permitting the movement control devices to be simplified. "Running away" of the Scanning device out of the groove becomes less of a danger.

Electrooptic light modulators are wellknown in the art, see for example 'Electrooptic Light Modulators' by I. P. Kaminow and E. H. Turner in Proceedings of the IEEE, vol. 54, no. 10, October 1966, pp. 1374 – 1390.

For the laser modes $TEM_{oo}$ and $TEM_{01}$ look, for example, to 'Laser Beams and Resonators' by H. Kogelnik and T. Li, Applied Optics, vol. 5, no. 10, October 1966, pp. 1550 – 1566. As an example, the SpectraPhysics Argon-Ion-Laser model 164 is usually oscillating in the $TEM_{oo}$ mode.

Laser resonator mirrors optimally decoupling light at several wavelengths from a laser resonator, for instance wavelength 514,5 nm and 488 nm from an argon ion laser, are for example dielectric broadband mirrors; see, for example, Spectra Physics Data Sheet for Laser Mirrors, Oct. 1971. A photoresist layer (photolacquer layer) which can be employed is for example an approximately 0.4 microns thick layer of commercially available photoresist Shipley AZ-1350 with additional sensibilisation with 2 % benzotriazole.

The diameters of the eilliptical focus of the light beam are typical 1 micron and 4 microns, respectively. The diameter of the circular focus is typically 1 micron.

The light power of an ultraviolet light beam of wavelength 257 nm necessary for properly exposing the photoresist layer is in the range of 20 milliwatts to 50 milliwatts for real-time recording speed of typical 4 Megacycles.

The ultraviolet laser beam of wavelength 257 nm is for example generated by frequency doubling a green laserlight beam, of wavelength 514,5 nm of an Argon-Ion-Laser.

The intensity range of the modulated laser beam is typically 0.05 $I_o$ to $I_o$, where $I_o$ is the intensity of the unmodulated beam.

It will be understood that the above description of the present invention is susceptible to various modifications, changes and adaptations, and the same are intended to be comprehended within the meaning and range of equivalents of the appended claims.

We claim:

1. A record carrier in which a spatial representation of information is recorded along a continuous guide path and is to be played back according to the pressure scanning technique, said carrier having a groove-shaped recording track extending along the path and composed of a continuous strip having a constant width constituting a track guide for the guidance of a pressure transducer playback device, and a series of rounded protrusions alternating with sections of finite length of the continuous strip along the path and constituting consecutive spots modulated in accordance with the information, the protrusions extending laterally from said strip to present recesses in the carrier and being arranged substantially symmetrically to the center line of said strip, the peripheries of the recesses having the form of ellipses whose major axes are perpendicular to the length of the recording track, and the recesses being formed by a laser beam which has an ellipical cross section and which is modulated in accordance with the information.

2. A record carrier as defined in claim 1 wherein the width of said recording track in the region of said recesses is approximately twice the width of said track in a region between successive recesses.

3. A record carrier as defined in claim 1 wherein the groove-shaped track has a constant depth.

4. A record carrier as defined in claim 1 wherein the depth of said recording track is greater in the regions of said recesses than in the region between successive recesses.

5. A record carrier as defined in claim 4 wherein each recess has a maximum depth at its center and all recesses have the same maximum depth.

6. A record carrier as defined in claim 4 wherein the depth of said recording track in the regions between successive recesses is substantially constant.

7. A record carrier as defined in claim 6 wherein the recesses are rounded in the direction of the depth of the recording track.

* * * * *